(12) United States Patent
Fukushima

(10) Patent No.: US 11,764,443 B2
(45) Date of Patent: Sep. 19, 2023

(54) ELECTROCHEMICAL CELL

(71) Applicant: KYOCERA Corporation, Kyoto (JP)

(72) Inventor: Takaaki Fukushima, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 233 days.

(21) Appl. No.: 17/252,730

(22) PCT Filed: Jun. 26, 2019

(86) PCT No.: PCT/JP2019/025368
§ 371 (c)(1),
(2) Date: Dec. 16, 2020

(87) PCT Pub. No.: WO2020/004458
PCT Pub. Date: Jan. 2, 2020

(65) Prior Publication Data
US 2021/0218115 A1    Jul. 15, 2021

(30) Foreign Application Priority Data
Jun. 27, 2018   (JP) .................................. 2018-121980

(51) Int. Cl.
*H01M 50/516* (2021.01)
*H01M 50/105* (2021.01)
*H01M 50/227* (2021.01)
*H01M 50/211* (2021.01)

(52) U.S. Cl.
CPC ....... *H01M 50/516* (2021.01); *H01M 50/105* (2021.01); *H01M 50/211* (2021.01); *H01M 50/227* (2021.01)

(58) Field of Classification Search
CPC ............. H01M 50/516; H01M 50/227; H01M 50/105; H01M 50/211
See application file for complete search history.

(56) References Cited

U.S. PATENT DOCUMENTS

2012/0156538 A1    6/2012   Meintschel et al.

FOREIGN PATENT DOCUMENTS

| EP | 2728643 A1 | | 5/2014 |
|----|---|---|---|
| JP | H11162443 A | | 6/1999 |
| JP | 200455153 A | | 2/2004 |
| JP | 2006172994 A | | 6/2006 |
| JP | 201348042 A | | 3/2013 |
| JP | 2013048042 A | * | 3/2013 |

(Continued)

OTHER PUBLICATIONS

Translation JP2013048042 (Year: 2013).*

*Primary Examiner* — Jane J Rhee
(74) *Attorney, Agent, or Firm* — HAUPTMAN HAM, LLP

(57) ABSTRACT

An electrochemical cell includes a first single cell including a first power generation element and a first inner container which accommodates the first power generation element, a second single cell including a second power generation element and a second inner container which accommodates the second power generation element, and an outer container which accommodates the first single cell and the second single cell, and the first single cell and the second single cell are stacked, and the electrochemical cell includes at least one welded portion in which the first inner container and the second inner container are welded to each other.

15 Claims, 13 Drawing Sheets

(56) References Cited

FOREIGN PATENT DOCUMENTS

| | | | |
|---|---|---|---|
| JP | 2015179618 | A | 10/2015 |
| JP | 2017130378 | A | 7/2017 |
| JP | 2018081885 | A | 5/2018 |
| WO | 2016205663 | A1 | 12/2016 |

* cited by examiner

ELECTROCHEMICAL CELL

CROSS-REFERENCE TO RELATED APPLICATION

This application is a national stage entry according to 35 U.S.C. 371 of International Application No. PCT/JP2019/025368 filed on Jun. 26, 2019, which claims priority to Japanese Patent Application No. 2018-121980 filed on Jun. 27, 2018.

TECHNICAL FIELD

The present disclosure relates to an electrochemical cell.

BACKGROUND

As the electrochemical cell, for example, the electrochemical cell described in Japanese Unexamined Patent Publication JP-A 2013-48042 (hereinafter referred to as Patent Literature 1) has been proposed. The electrochemical cell described in Patent Literature 1 includes a thin battery including a sheet-shaped electrode group, a non-aqueous electrolyte, and a first exterior body which hermetically accommodates the electrode group and the non-aqueous electrolyte, and a second exterior body which hermetically accommodates the thin battery.

SUMMARY

An electrochemical cell of the disclosure includes a first single cell including a first power generation element and a first inner container which accommodates the first power generation element, a second single cell including a second power generation element and a second inner container which accommodates the second power generation element, and an outer container which accommodates the first single cell and the second single cell, and the first single cell and the second single cell are stacked, and the electrochemical cell further includes a welded portion in which the first inner container and the second inner container are welded to each other.

DETAILED DESCRIPTION

Figure 1:
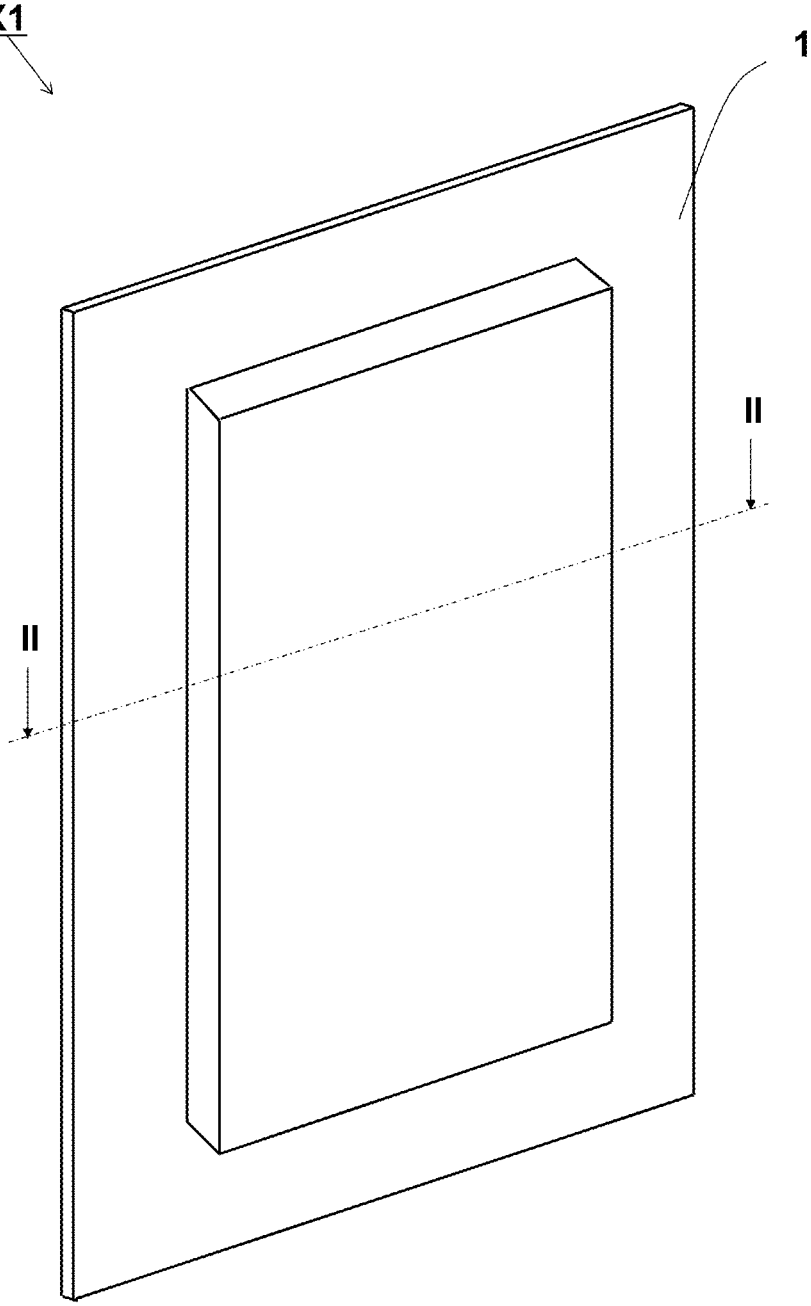
FIG. 1 shows a perspective view of an electrochemical cell X1.
Figure 2:
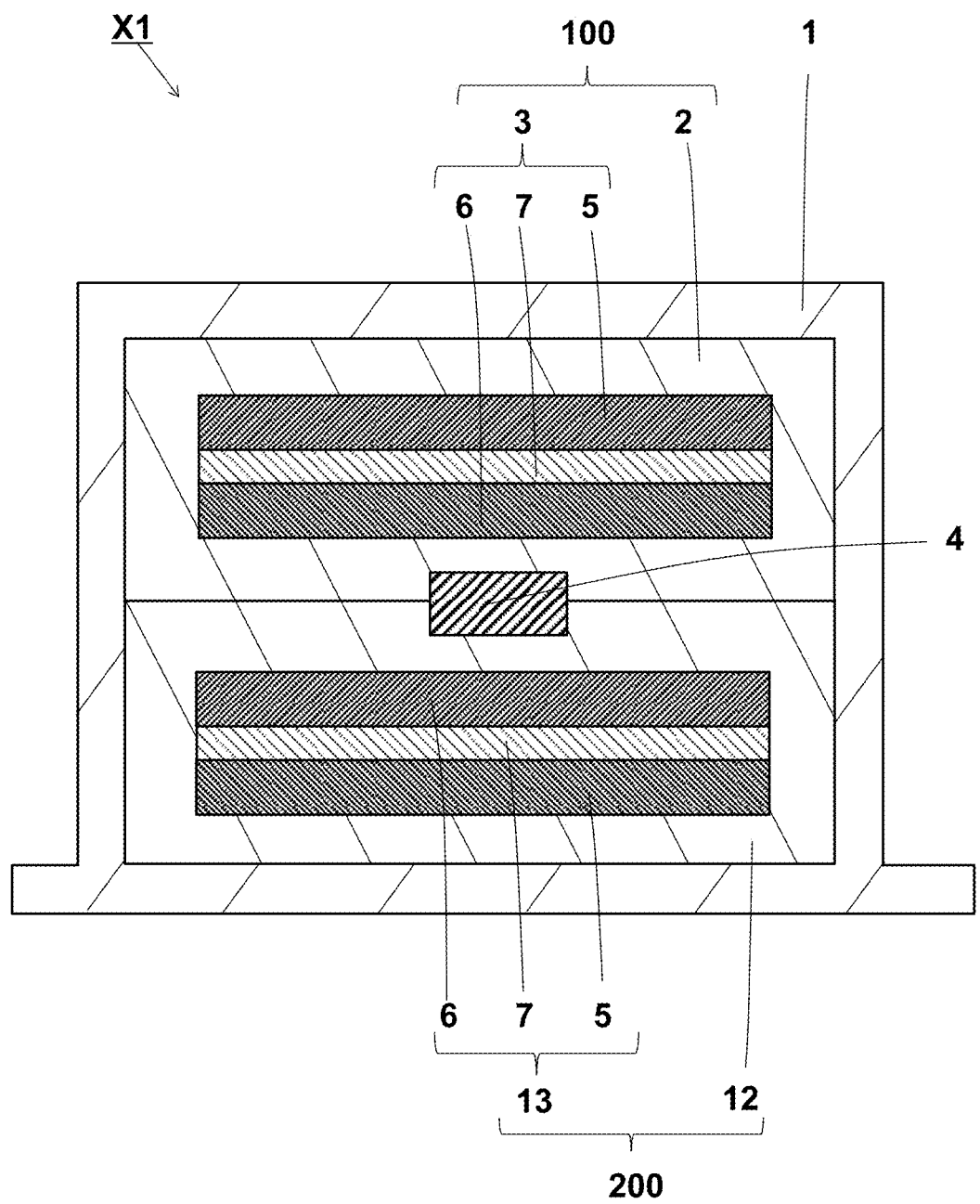
FIG. 2 shows a cross-sectional view of the electrochemical cell X1 of FIG. 1 taken along the line II-II.

An electrochemical cell X1 will be described in detail with reference to FIGS. 1 and 2. As shown in FIGS. 1 and 2, the electrochemical cell X1 includes a first single cell 100, a second single cell 200, and an outer container 1 which accommodates the first single cell 100 and the second single cell 200. The first single cell 100 and the second single cell 200 are fixed by a welded portion 4.

The first single cell 100 is a member of the smallest unit that functions as a battery in the electrochemical cell X1. The first single cell 100 is, for example, a lithium ion battery. The first single cell 100 includes a first power generation element 3, a first inner container 2, and a first terminal 8. The first single cell 100 has, for example, a plate shape. The first single cell 100 can conduct electricity to an external device by electrically connecting to the external device.

The first power generation element 3 is a member for storing and releasing electricity by utilizing an electrochemical reaction. The first power generation element 3 includes, for example, a positive electrode 5, a negative electrode 6, and a separator 7 located between the positive electrode 5 and the negative electrode 6. The first power generation element 3 can exchange cations and anions between the positive electrode 5 and the negative electrode 6 through the separator 7. The first power generation element 3 can conduct electricity to an external device by electrically connecting the positive electrode 5 and the negative electrode 6 to the external device.

The first power generation element 3 is, for example, a stack of the positive electrode 5, the separator 7, and the negative electrode 6. The first power generation element 3 has, for example, a plate shape. In the first power generation element 3, for example, the positive electrode 5, the separator 7, and the negative electrode 6 are stacked in a thickness direction of the plate shape.

The positive electrode 5 and the negative electrode 6 are, for example, electrochemically active substances. The positive electrode 5 and the negative electrode 6 may include, for example, an active material and an electrolyte. As the electrolyte, for example, a solvent or a solvent mixture to which salt is added can be used.

Specifically, as the positive electrode 5 and the negative electrode 6, for example, the active substances and electrolytes described in U.S. Provisional patent Application No. 61/787,382 entitled "Semi-Solid Electrodes Having High Rate Capability" and U.S. Provisional patent Application No. 61/787,372 entitled "Asymmetric Battery Having a Semi-Solid Cathode and High Energy Density Anode" can be used. The positive electrode 5 and the negative electrode 6 may include additives, for example.

The separator 7 is a member provided for exchanging cations and anions between the positive electrode 5 and the negative electrode 6. The separator 7 may be provided with, for example, fine holes through which cations and anions pass. For the separator 7, for example, a porous insulating material can be used. Specifically, as the separator 7, for example, polyolefin or polyvinyl chloride can be used. Since the first power generation element 3 includes the separator 7, the positive electrode 5 and the negative electrode 6 can be electrically insulated from each other.

When the first power generation element 3 has a plate shape, the first power generation element 3 can be set to, for example, 50 to 500 mm in length, 50 to 300 mm in width, and 0.1 to 2 mm in thickness.

The first inner container 2 is a member provided with a space for wrapping the first power generation element 3 inside the first inner container 2. The first inner container 2 is provided to protect the first power generation element 3 from the external environment. More specifically, the first inner container 2 is provided to protect the first power generation element 3 from oxygen and water in the air. The first inner container 2 is provided to cover the entire first power generation element 3. The first inner container 2 has, for example, a bag shape. The first inner container 2 is formed, for example, by forming one member into a bag shape. The first inner container 2 may be formed by welding two members, for example. The first inner container 2 may have a rectangular shape, for example, when viewed from the stacking direction of the positive electrode 5, the separator 7, and the negative electrode 6.

The first inner container 2 includes, for example, an insulating material. As a result, the first inner container 2 can restrain the external environment and the first power generation element 3 from being short-circuited. Therefore, the first inner container 2 can protect the first power generation element 3 from the external environment. The first inner container 2 includes, for example, a resin material. More specifically, as the resin material, for example, polyethylene terephthalate, polyethylene, or the like can be used.

In addition, the first inner container 2 may have, for example, a multi-layer structure. The first inner container 2 may have, for example, a two-layer structure. Specifically, the first inner container 2 includes, for example, a thermosetting resin material and a heat-resistant resin material. The thermosetting resin material is specifically resin having a melting temperature of less than 100° C. The heat-resistant resin material is specifically resin having a melting temperature of 100° C. or higher and 300° C. or lower. As the heat-resistant resin material, for example, polyethylene terephthalate, polyethylene naphthalate, or the like can be used. As the thermosetting resin material, for example, polyethylene, polypropylene, or the like can be used.

In the case where the first inner container 2 is rectangular when viewed from the stacking direction of the first single cell 100 and the second single cell 200, the first inner container 2 can be set to, for example, 55 to 550 mm in length, 55 to 350 mm in width, and 0.1 to 2.2 mm in thickness.

The first terminal 8 is provided to electrically connect a first power generation element 103 and an external device. The first terminal 8 has, for example, a plate shape. Specifically, the first terminal 8 has, for example, a quadrangular shape when viewed from the stacking direction of the first single cell 100 and the second single cell 200. The first terminal 8 may have a rectangular shape, for example. The rectangular shape may include, for example, long sides and short sides.

When viewed from the stacking direction of the first single cell 100 and the second single cell 200, the first terminal 8 is in contact with the first power generation element 103. When viewed from the stacking direction of the first single cell 100 and the second single cell 200, the first terminal 8 is located on any side of an outer circumference of the first power generation element 103. The first terminal 8 extends outwardly from the first inner container 102 in order to be electrically connected to an external device. The first terminal 8 is electrically connected to an external connection terminal outside the first inner container 102.

The first terminal 8 is, for example, a conductive member. The first terminal 8 may include, for example, a metal material. More specifically, as the metal material, for example, aluminum, copper, or the like can be used.

When the first terminal 8 has a plate shape, the first terminal 8 can be set to, for example, 30 to 100 mm in length, 10 to 100 mm in width, and 0.1 to 0.5 mm in thickness.

Like the first single cell 100, the second single cell 200 is provided for passing electricity to an external device. In the electrochemical cell X1, the first single cell 100 and the second single cell 200 are connected in parallel. As a result, the capacity of the electrochemical cell X1 can be increased. The first single cell 100 and the second single cell 200 may be connected in series. As a result, the voltage of the electrochemical cell X1 can be increased.

The second single cell 200 is stacked on the first single cell 100 in the outer container 1. The second single cell 200 includes a second power generation element 13 and a second inner container 12. The second single cell 200 has the same shape as the first single cell 100 in the electrochemical cell X1. However, the second single cell 200 may have a shape different from that of the first single cell 100, for example. In the electrochemical cell X1, the second single cell 200 is stacked with the first single cell 100 so that an outer circumferences thereof correspond to each other. However, the second single cell 200 may be stacked with the first single cell 100 without aligning an outer circumference thereof.

As the second power generation element 13, for example, the material used for the first power generation element 3 can be used. More specifically, the second power generation element 13 may be formed of, for example, the same material as the first power generation element 3. As the second power generation element 13, for example, a material different from that of the first power generation element 3 may be used.

The second inner container 12 has the same shape as the first inner container 2 in the electrochemical cell X1. However, the second inner container 12 may have a different shape from the first inner container 2, for example. As the second inner container 12, for example, the material used for the first inner container 2 can be used. More specifically, the second inner container 12 may use the same material as the first inner container 2. As the second inner container 12, for example, a material different from that of the first inner container 2 may be used.

The second single cell 200 can be set to the same dimensions as the first single cell 100, for example. The second single cell 200 may have different dimensions from the first single cell 100, for example.

The outer container 1 is a member provided with a space for wrapping the first single cell 100 and the second single cell 200 inside the outer container 1. The outer container 1 is a member for protecting the first single cell 100 and the second single cell 200 from the external environment. More specifically, the outer container 1 is a member for protecting the first single cell 100 and the second single cell 200 from oxygen and moisture in the air. The outer container 1 has, for example, a bag shape. The outer container 1 is formed, for example, by forming one member into a bag shape. The outer container 1 may be formed by welding two members, for example. The outer container 1 may have a rectangular shape when viewed from the stacking direction of the first single cell 100 and the second single cell 200.

The outer container 1 includes, for example, an insulating material. As a result, the outer container 1 can restrain the external environment, and the first single cell 100 and the second single cell 200 from being short-circuited. Therefore, the outer container 1 can protect the first single cell 100 and the second single cell 200 from the external environment. As the insulating material, for example, a resin material can be used. More specifically, as the resin material, for example, polyethylene terephthalate, polyethylene, or the like can be used.

The outer container 1 has, for example, a multi-layer structure. The outer container 1 may have, for example, a three-layer structure. Specifically, the outer container 1 may include, for example, a first insulating layer, a moisture-proof layer, and a second insulating layer. Here, the moisture-proof layer is located between, for example, the first insulating layer and the second insulating layer. Specifically, the moisture-proof layer may be covered with, for example, the first insulating layer and the second insulating layer.

The first insulating layer includes, for example, a resin material. Specifically, as the resin material, for example, polyethylene terephthalate, polyethylene naphthalate, or the like can be used.

The moisture-proof layer is provided to restrain oxygen and water that permeated the first resin layer from reaching the second resin layer. The moisture-proof layer includes, for example, a metal material. Specifically, as the metal material, for example, aluminum, copper, or the like can be used.

The second resin layer includes, for example, a resin material. Specifically, as the resin material, for example, polyethylene, polypropylene, or the like can be used.

Since the outer container 1 includes the moisture-proof layer, the first single cell 100 and the second single cell 200 can be protected from oxygen and water that permeated the first resin layer. As a result, the possibility that the first single cell 100 and the second single cell 200 are damaged can be reduced.

In the case where the outer container 1 is rectangular when viewed from the stacking direction of the first single cell 100 and the second single cell 200, it can be set to, for example, 60 to 600 mm in length, 60 to 400 mm in width, and 1 to 20 mm in thickness.

The welded portion 4 is a portion where the first inner container 2 and the second inner container 12 are welded to each other. The welded portion 4 is provided to fix the first single cell 100 and the second single cell 200. In the welded portion 4, for example, the material of the first inner container 2 and the material of the second inner container 12 may be diffused from each other. In the welded portion 4, for example, the material of the first inner container 2 and the material of the second inner container 12 may be entangled with each other. The welded portion 4 may include, for example, a crystalline portion in which the molecules of the material of the first inner container 2 and the molecules of the material of the second inner container 12 are aligned according to a certain rule.

As shown in FIG. 2, the first inner container 2 and the second inner container 12 are welded, so that the first single cell 100 and the second single cell 200 are fixed in the outer container 1. Therefore, the possibility that the positions of the first single cell 100 and the second single cell 200 are displaced is reduced without increasing the size of the electrochemical cell X1. As a result, it is possible to reduce the possibility that the reliability of the electrical connection of the electrochemical cell X1 is impaired and also the possibility that the thickness is partially increased at the fixed portion.

As shown in FIG. 2, the welded portion 4 is located between, for example, the first power generation element 3 and the second power generation element 13. The welded portion 4 has, for example, a plate shape. The welded portion 4 is, for example, strip-shaped when viewed from the stacking direction of the first single cell 100 and the second single cell 200. The welded portion 4 may have a quadrangular shape, for example. When the welded portion 4 has a quadrangular shape, for example, the corners of the quadrangular shape may be rounded. As a result, the external force becomes difficult to concentrate on the corners of the quadrangular welded portion 4 and the possibility that the welded portion 4 is damaged can be reduced.

The welded portion 4 has, for example, an insulating material. As the insulating material, for example, a resin material can be used. Specifically, for example, polyethylene terephthalate, polyethylene, or the like may be used as the welded portion 4.

In addition, as the welded portion 4, for example, a material whose light transmittance changes when welded can be used. As a result, the welded portion 4 can be easily visually confirmed. As the welded portion 4, for example, a material whose hardness increases when welded may be used. Therefore, the possibility that the electrochemical cell X1 is deformed by receiving an external force can be reduced. As a result, the reliability of the electrical connection of the electrochemical cell X1 can be improved.

When the welded portion 4 has a plate shape, it can be set to, for example, 1 to 100 mm in length, 1 to 20 mm in width, and 0.02 to 1 mm in thickness.

The welded portion 4 is formed by, for example, ultrasonically welding the first inner container 2 and the second inner container 12. The method of ultrasonic welding will be described more specifically below. First, the first inner container 2 and the second inner container 12 are fixed on a table, and a horn is brought into contact with the position where the first inner container 2 and the second inner container 12 are to be welded to each other. The horn referred to here is, for example, a member that vibrates at a frequency of 20 to 40 kHz. The horn includes a head portion that comes into contact with a welding position and a connection portion that transmits vibration to the head portion. Specifically, the head portion has a rectangular shape when viewed from the stacking direction of the first inner container 2 and the second inner container 12, for example. The head portion may have a square shape, for example.

Next, the horn is vibrated to give vibration energy to the first inner container 2 and the second inner container 12. The vibration energy transmitted from the horn melts the interface where the first inner container 2 and the second inner container 12 come into contact with each other. After that, the welded portion 4 is formed by cooling the melted portion of the first inner container 2 and the second inner container 12 while applying pressure.

In addition, the welded portion 4 may be formed by, for example, heat-sealing the first inner container 2 and the second inner container 12. The heat sealing method will be specifically described below. First, the heated metal plate is brought into contact with the position where the first inner container 2 and the second inner container 12 are to be welded. Next, the first inner container 2 and the second inner container 12 are applied with heat and melted. After that, the welded portion 4 is formed by cooling the portion where the first inner container 2 and the second inner container 12 are melted.

The metal plate is heated to, for example, 100 to 200° C. The metal plate has, for example, a plate shape. Specifically, the metal plate has a rectangular shape when viewed from the stacking direction of the first inner container 2 and the second inner container 12. The metal plate may have a square shape, for example.

The welded portion 4 may be formed by any method without being limited to the methods of ultrasonic welding and heat sealing.

Figure 3:
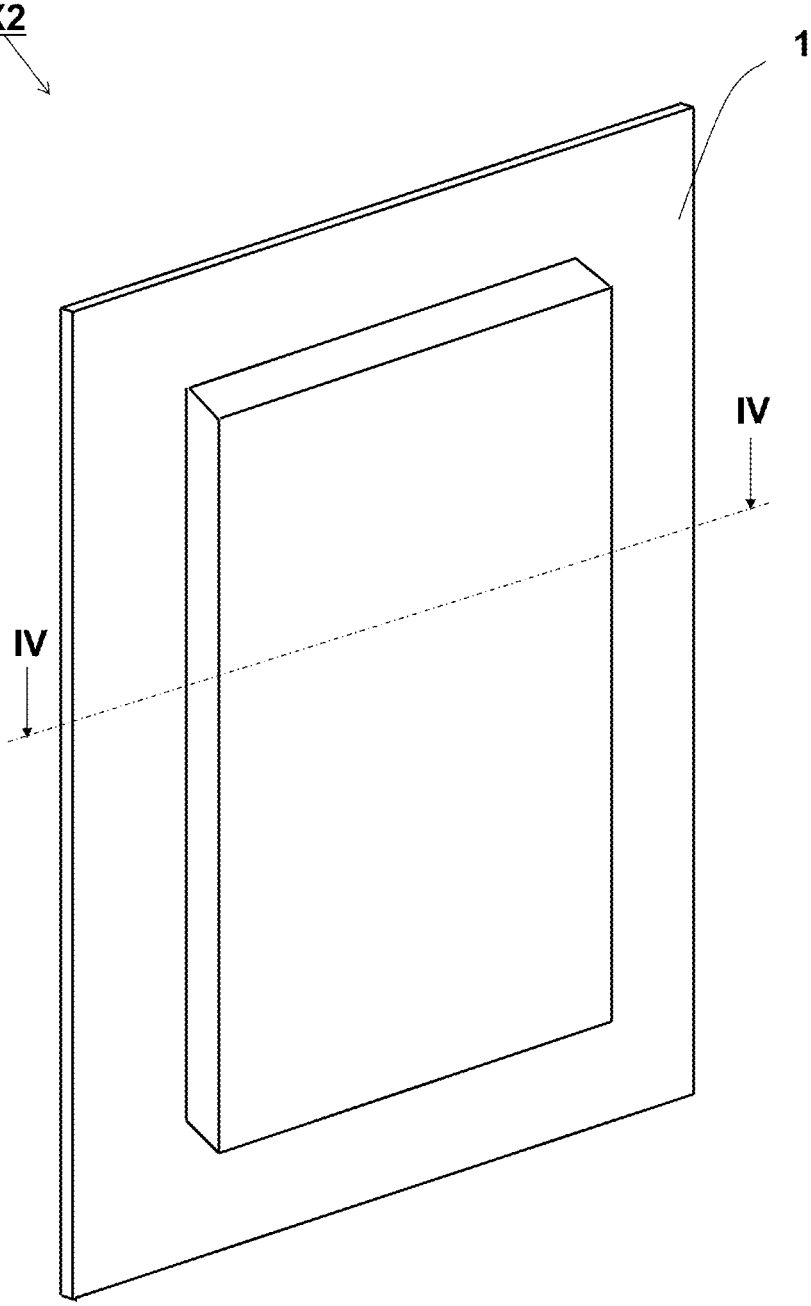
FIG. 3 shows a perspective view of an electrochemical cell X2.
Figure 4:
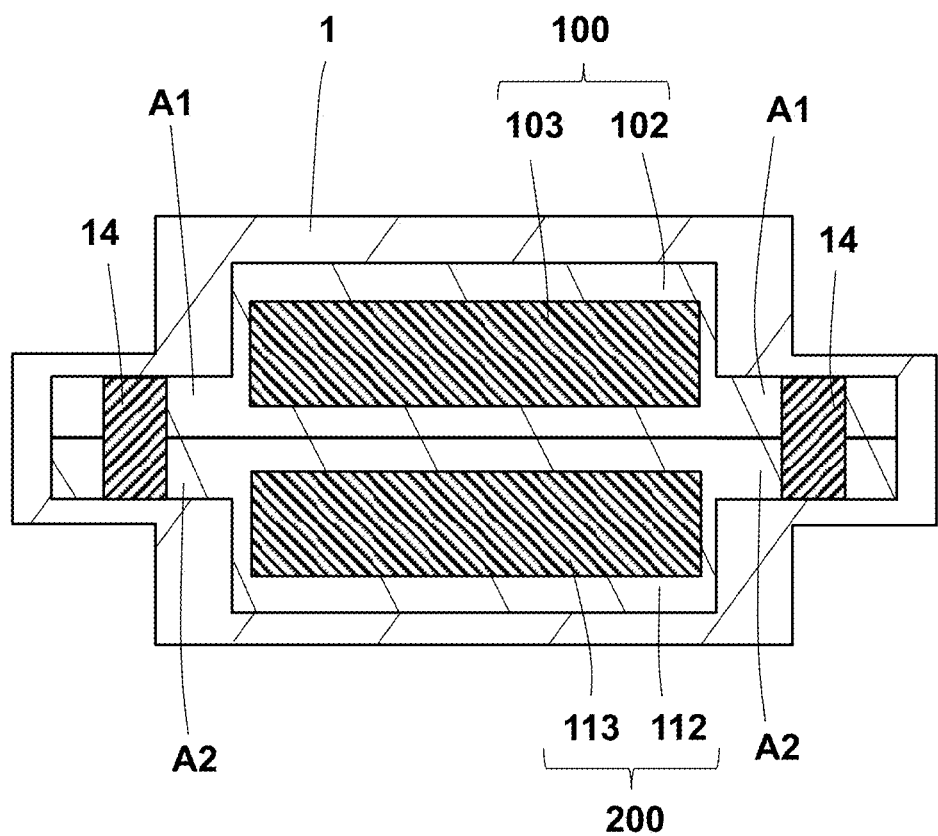
FIG. 4 shows a cross-sectional view of the electrochemical cell X2 of FIG. 3 taken along the line IV-IV.

An electrochemical cell X2 will be described in detail with reference to FIGS. 3 to 5. As shown in FIGS. 3 and 4, the electrochemical cell X2 includes the first single cell 100, the second single cell 200, and the outer container 1 which accommodates the first single cell 100 and the second single cell 200. The first single cell 100 and the second single cell 200 are fixed by a welded portion 14.

The electrochemical cell X2 is different from the electrochemical cell X1 in the shape of a first power generation element 103, the shape of a first inner container 102, the shape of a second power generation element 113, and the shape of a second inner container 112. Further, the electrochemical cell X2 is different from the electrochemical cell X1 in the position and shape of the welded portion 14. The others are the same as those of the electrochemical cell X1, and thus, the description thereof is omitted.

The first single cell 100 includes the first power generation element 103 and the first inner container 102. The first power generation element 103 has, for example, a rectangular shape when viewed from the stacking direction of the first single cell 100 and the second single cell 200. More specifically, the first power generation element 103 may have, for example, a rectangular shape including long sides and short sides.

The first inner container 102 has, for example, a rectangular shape when viewed from the stacking direction of the first single cell 100 and the second single cell 200. More specifically, the first inner container 102 may have, for example, a rectangular shape including long sides and short sides. The first inner container 102 includes a first peripheral edge portion A1. The first peripheral edge portion A1 is a portion located on a periphery of the first inner container 102. Specifically, the first peripheral edge portion A1 means a region extending from an outer circumference of the first inner container 102 to an outer circumference of the first power generation element 103 when viewed from the stacking direction of the first single cell 100 and the second single cell 200. That is, the first peripheral edge portion A1 is a region where the first power generation element 103 and the first inner container 102 do not overlap with each other.

The second single cell 200 includes the second power generation element 113 and the second inner container 112. The second power generation element 113 has the same shape as the first power generation element 103 in the electrochemical cell X2. However, the first power generation element 103 and the second power generation element 113 may have different shapes. As the second power generation element 113, the material used in the first power generation element 103 can be used. More specifically, the second power generation element 113 may be formed of, for example, the same material as the first power generation element 103.

The second inner container 112 has the same shape as the first inner container 102 in the electrochemical cell X2. However, the second inner container 112 and the first inner container 102 may have different shapes, for example. As the second inner container 112, the material used for the first inner container 102 can be used. Specifically, the second inner container 112 may be formed of the same material as the first inner container 102, for example. The second inner container 112 includes a second peripheral edge portion A2. The second peripheral edge portion A2 is a portion located on a periphery of the second inner container 112. Specifically, the second peripheral edge portion A2 means a region extending from an outer circumference of the second inner container 112 to an outer circumference of the second power generation element 113 when viewed from the stacking direction of the first single cell 100 and the second single cell 200. That is, it is a region where the second power generation element 113 and the second inner container 112 do not overlap with each other.

The first power generation element 103 and the second power generation element 113 are stacked so that the respective long sides and the respective short sides thereof correspond to each other when viewed from the stacking direction of the first single cell 100 and the second single cell 200. The first inner container 102 and the second inner container 112 are stacked so that the respective long sides and the respective short sides thereof correspond to each other when viewed from the stacking direction of the first single cell 100 and the second single cell 200.

In FIG. 4, the positive electrodes 5, the separators 7, and the negative electrodes 6 of the first power generation element 103 and the second power generation element 113 are omitted.

As shown in FIG. 4, in the welded portion 14, the first peripheral edge portion A1 and the second peripheral edge portion A2 are welded to each other. As a result, as compared with the case where the welded portion 14 is located at the portion where the first inner container 102 and the second inner container 112, and the first power generation element 103 and the second power generation element 113 overlap, a gap can be provided between the welded portion 14, and the first power generation element 103 and the second power generation element 113. Therefore, in the welded portion 14, the influence of thermal stress due to the heat generated from the first power generation element 103 and the second power generation element 113 can be reduced. As a result, the possibility that the welded portion 14 is damaged can be reduced.

Figure 5:
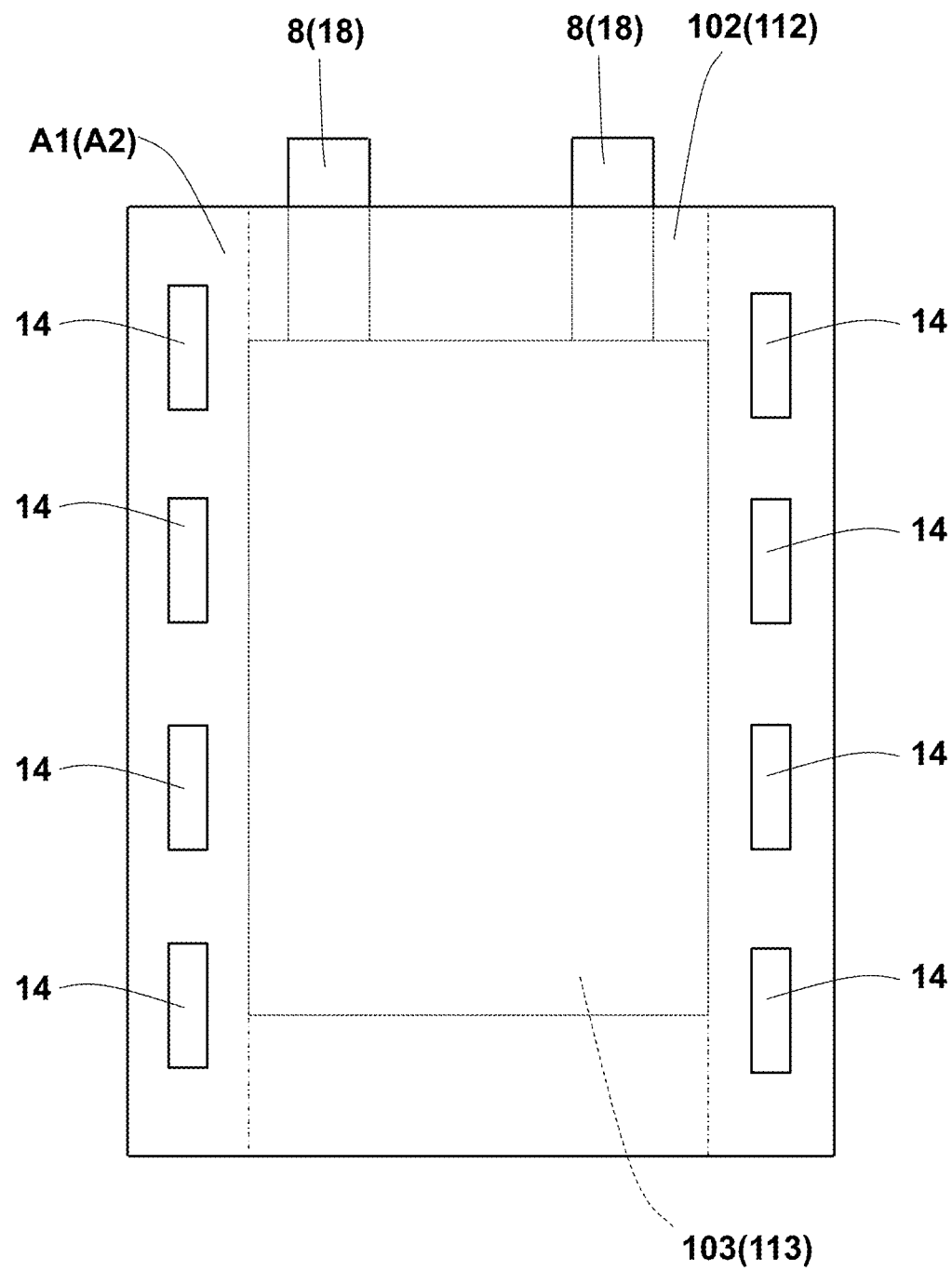
FIG. 5 is a top view when a stack of a first single cell and a second single cell is taken out from an outer container of the electrochemical cell X2 and viewed from a stacking direction of the first single cell and the second single cell.

FIG. 5 shows a top view when the stack of the first single cell 100 and the second single cell 200 is taken out from the outer container 1 of the electrochemical cell X2 and viewed from the stacking direction of the first single cell 100 and the second single cell 200. The outer circumferences of the first power generation element 103 and the second power generation element 113 when viewed from the stacking direction of the first power generation element 103 and the second power generation element 113 through the first inner container 102 and the second inner container 112 are indicated by dotted lines. The extension lines of the long sides of the first power generation element 103 and the second power generation element 113 are indicated by alternate long and short dash lines as virtual lines.

As shown in FIGS. 4 and 5, a plurality of welded portions 14 may be provided. As a result, the plurality of welded portions 14 can disperse the external force to the plurality of welded portions 14. Therefore, the external force becomes difficult to concentrate on one welded portion 14. As a result, the possibility that the welded portion 14 is damaged can be reduced.

As shown in FIG. 5, the welded portion 14 may be located along each long side of the first power generation element 103 and the second power generation element 113. The welded portion 14 may be located along an extension line of each long side of the first power generation element 103 and the second power generation element 113. As a result, by locating the welded portion along the long side that is susceptible to the external force, the possibility that the first single cell 100 or the second single cell 200 is displaced in the short side direction is reduced. As a result, the reliability of the electrical connection of the electrochemical cell can be improved.

In addition, when viewed from the stacking direction of the first single cell 100 and the second single cell 200, the welded portion 14 has, for example, a quadrangular shape. Specifically, the welded portion 14 may be, for example, a rectangular shape including long sides. Here, the long sides of the welded portion 14 may be along the long sides of the first power generation element 103. As a result, the welded portion can be positioned along the long side that is susceptible to the external force. Therefore, the possibility that the first single cell 100 or the second single cell 200 is displaced in the short side direction can be reduced. As a result, the reliability of the electrical connection of the electrochemical cell can be improved.

Figure 6:
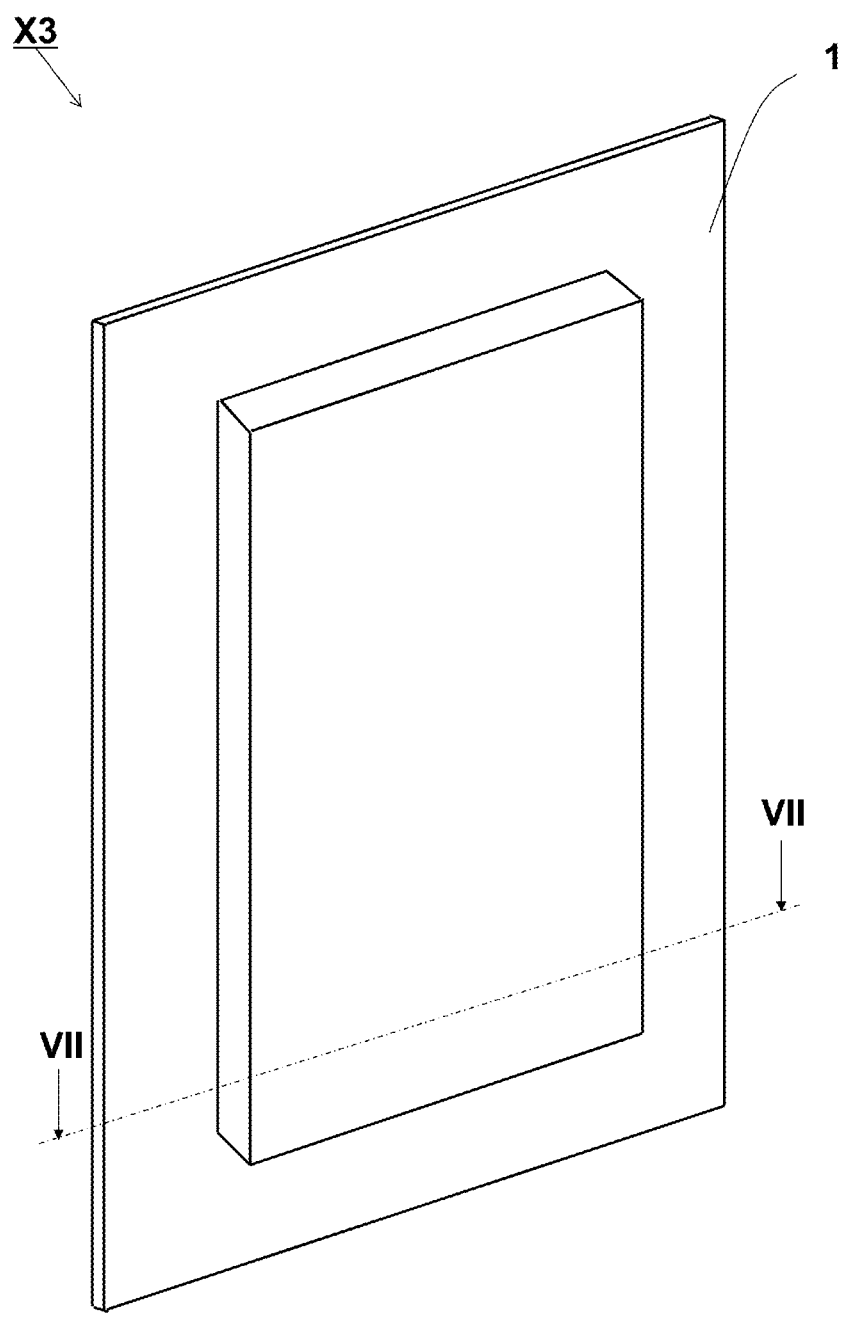
FIG. 6 shows a perspective view of an electrochemical cell X3.
Figure 7:
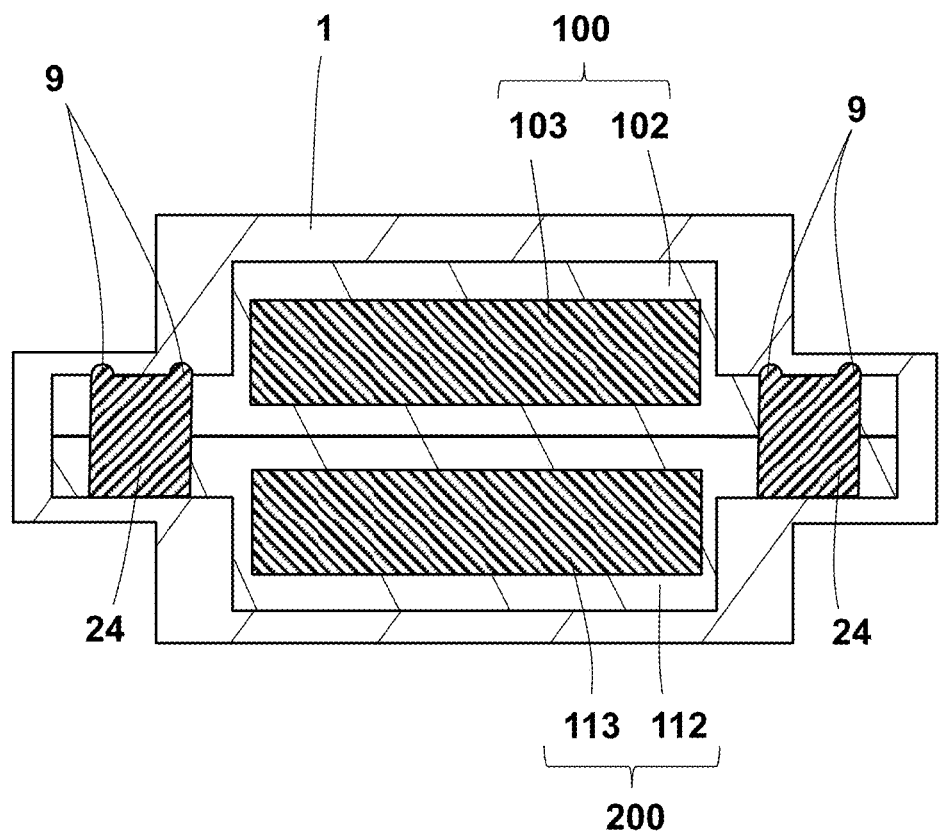
FIG. 7 shows a cross-sectional view of the electrochemical cell X3 of FIG. 6 taken along the line VII-VII.

An electrochemical cell X3 will be described in detail with reference to FIGS. 6 to 8. As shown in FIGS. 6 and 7, the electrochemical cell X3 includes the first single cell 100, the second single cell 200, and the outer container 1 which accommodates the first single cell 100 and the second single cell 200. Further, the first single cell 100 and the second single cell 200 are fixed by a welded portion 24. The electrochemical cell X3 is different from the electrochemical cell X2 in that the position of the welded portion 24 is different and that the welded portion 24 includes a convex portion 9. The others are the same as those of the electrochemical cell X2, and thus, the description thereof is omitted.

Figure 8:
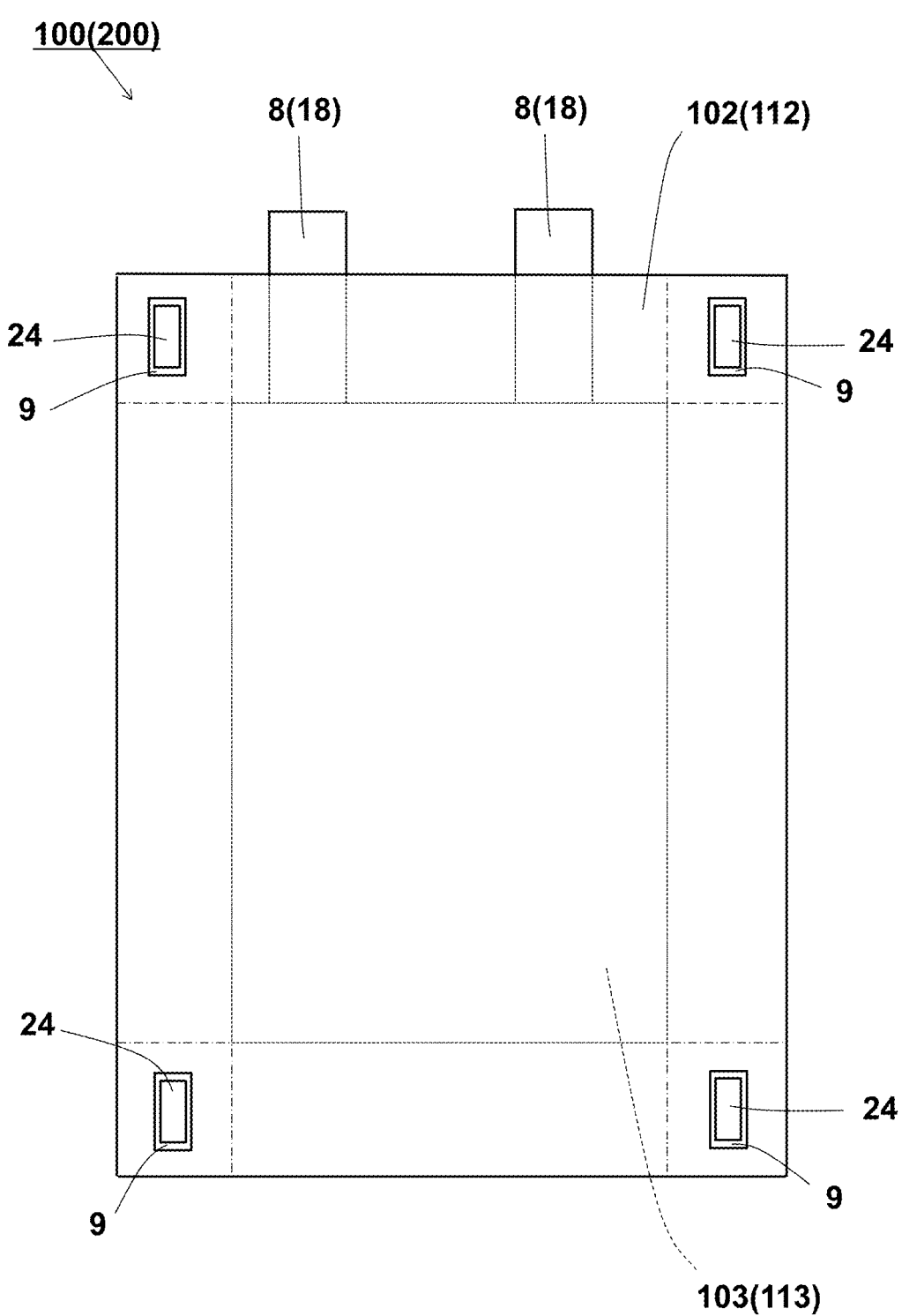
FIG. 8 is a top view when a stack of a first single cell and a second single cell is taken out from an outer container of the electrochemical cell X3 and viewed from a stacking direction of the first single cell and the second single cell.

Similarly to FIG. 5, FIG. 8 shows a top view when the stack of the first single cell 100 and the second single cell 200, in which the respective long sides and the respective short sides thereof correspond to each other, is taken out from the outer container 1 of the electrochemical cell X3 and viewed from the stacking direction of the first single cell 100 and the second single cell 200. The extension lines of the respective long sides and the respective short sides of the first power generation element 103 and the second power generation element 113 are indicated as alternate long and short dash lines as virtual lines.

As shown in FIG. 8, the welded portion 24 may be located at the four corners of the first peripheral edge portion A1 and the second peripheral edge portion A2 when viewed from the stacking direction of the first single cell 100 and the second single cell 200. More specifically, the four corners of the first peripheral edge portion A1 and the second peripheral edge portion A2 mean a region surrounded by the extension lines of the respective long sides of the first power generation element 103 and the second power generation element 113, the extension lines of the respective short sides of the first power generation element 103 and the second power generation element 113, and the outer circumferences of the first inner container 102 and the second inner container 112. As a result, the first single cell 100 and the second single cell 200 can be made difficult to be deformed in the four corner regions of the first single cell 100 and the second single cell 200 where the external force is easily concentrated. As a result, the reliability of the electrical connection of the electrochemical cell can be improved.

In addition, as shown in FIGS. 7 and 8, the welded portion 24 includes the convex portion 9. The convex portion 9 is provided to disperse the external force applied to the welded portion 24 to the convex portion 9 itself. As a result, the possibility that the welded portion 24 is damaged can be reduced. The convex portion 9 is provided at a position adjacent to the welded portion 24, for example. Specifically, the convex portion 9 may be located along an outer circumference of the welded portion 24, for example.

In the electrochemical cell X3, the convex portion 9 is linear. More specifically, the convex portion 9 has a frame shape when viewed from the stacking direction of the first single cell 100 and the second single cell 200. As shown in FIG. 7, the cross section of the convex portion 9 has a semicircular shape.

The convex portion 9 includes, for example, an insulating material. As the insulating material, for example, a resin material may be used. More specifically, as the resin material, for example, polyethylene terephthalate, polyethylene, or the like may be used.

In addition, the convex portion 9 can be formed of the same material as the welded portion 24. Therefore, coefficients of thermal expansion of the convex portion 9 and the welded portion 24 can be made the same. As a result, the possibility that the convex portion 9 and the welded portion 24 are separated due to the difference in the coefficient of thermal expansion can be reduced. The convex portion 9 may be formed at the same time as forming the welded portion 24, for example.

In addition, the convex portion 9 may be formed of, for example, a material different from that of the welded portion 24. More specifically, the convex portion 9 may have a higher elastic modulus than that of the welded portion 24. As a result, when an external force is applied to the convex portion 9, the convex portion 9 is deformed, so that the external force becomes difficult to be transmitted to the welded portion 24. Therefore, the possibility that the welded portion 24 is damaged can be reduced.

In addition, a plurality of convex portions 9 may be provided for one welded portion 24, for example. As a result, the external force can be dispersed to the plurality of convex portions 9, so that the external force is less likely to be concentrated on one convex portion 9. Therefore, the possibility that the convex portion 9 is damaged can be reduced.

In the case where the convex portion 9 is linear when viewed from the stacking direction of the first single cell 100 and the second single cell 200, the convex portion 9 can be set to, for example, 1 to 50 mm in length, 1 to 10 mm in width, and 0.1 to 5 mm in thickness.

Figure 9:
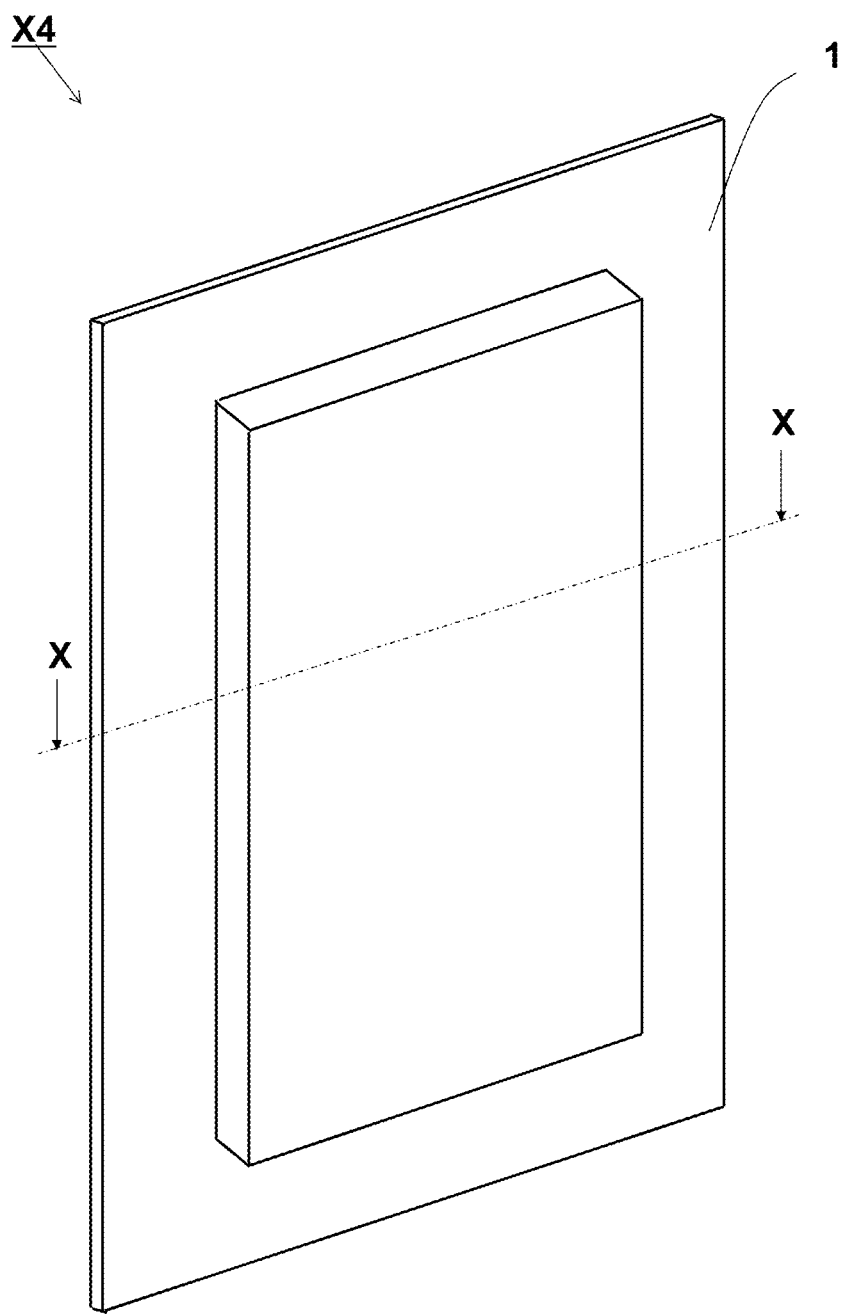
FIG. 9 shows a perspective view of an electrochemical cell X4.

An electrochemical cell X4 will be described in detail with reference to FIGS. 9 to 11. The electrochemical cell X4 is different from the electrochemical cell X3 in that the first single cell 100 includes the first terminal 8 and the second single cell 200 includes a second terminal 18. Further, the electrochemical cell X4 is different from the electrochemical cell X3 in that the position of a welded portion 34 is different. The others are the same as those of the electrochemical cell X3, and thus, the description thereof is omitted.

Figure 11:
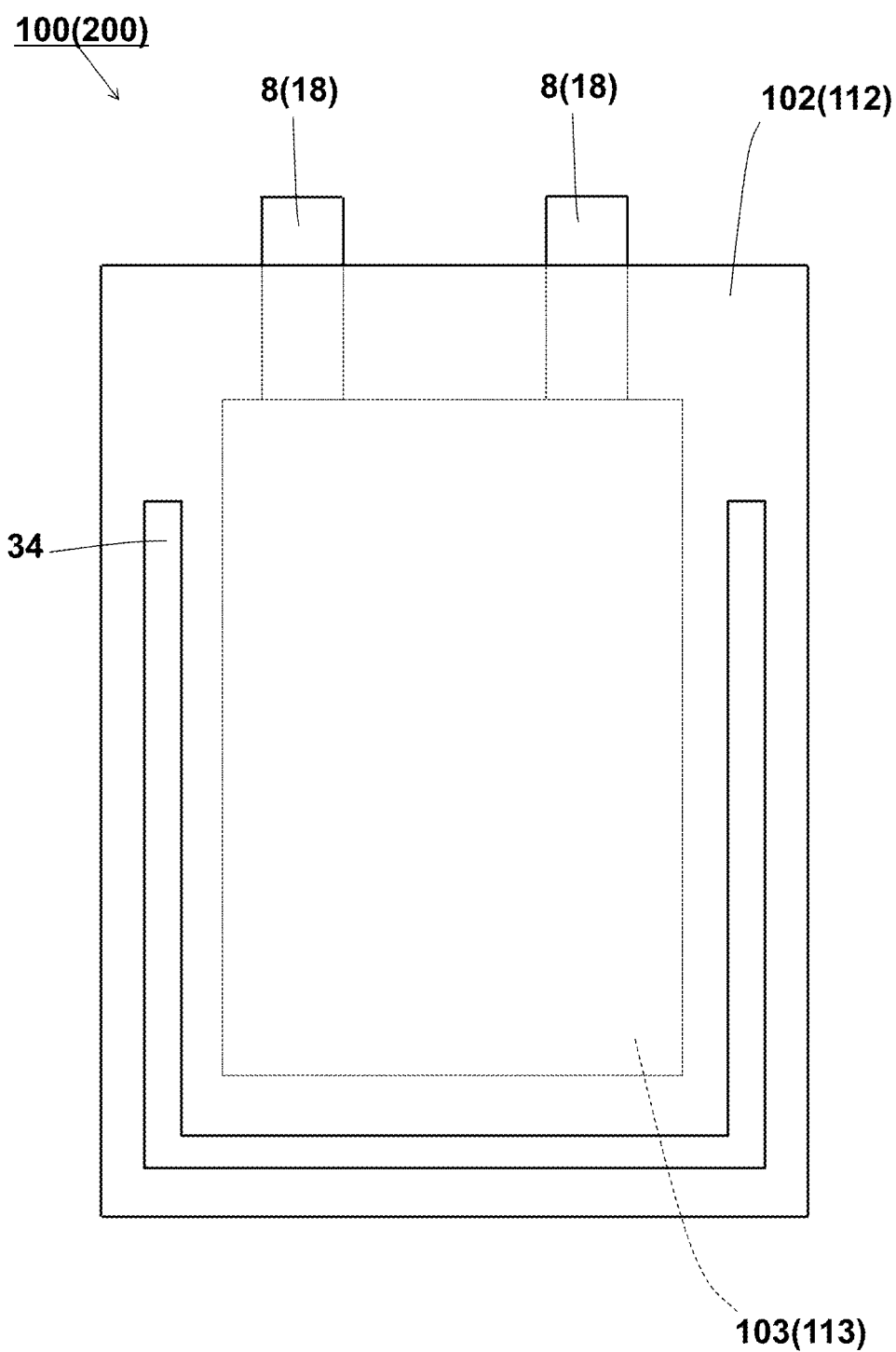
FIG. 11 is a top view when a stack of a first single cell and a second single cell is taken out from an outer container of the electrochemical cell X4 and viewed from a stacking direction of the first single cell and the second single cell.

As in FIG. 8, FIG. 11 shows a top view when the stack of the first single cell 100 and the second single cell 200, in which the respective long sides and the respective short sides thereof correspond to each other, is taken out from the outer container 1 of the electrochemical cell X4 and viewed from the stacking direction of the first single cell 100 and the second single cell 200.

When viewed from the stacking direction of the first single cell 100 and the second single cell 200, the first power generation element 103 includes the first terminal 8 extending outwardly from a side thereof. The first terminal 8 is provided to electrically connect the first power generation element 103 and an external device. The first terminal 8 has, for example, a plate shape. Specifically, the first terminal 8 has a quadrangular shape when viewed from the stacking direction of the first single cell 100 and the second single cell 200, for example. The first terminal 8 may have a rectangular shape, for example. Specifically, the rectangular shape may include long sides and short sides, for example.

In the electrochemical cell X4, the first terminal 8 is in contact with the first power generation element 103 when viewed from the stacking direction of the first single cell 100 and the second single cell 200. When viewed from the stacking direction of the first single cell 100 and the second single cell 200, the first terminal 8 is located on any side of the outer circumference of the first power generation element 103. In addition, the first terminal 8 extends outside the first inner container 102 in order to be electrically connected to an external device.

The first terminal 8 is, for example, a conductive member. The first terminal 8 may include, for example, a metal material. More specifically, as the metal material, for example, aluminum, copper, or the like can be used.

When the first terminal 8 has a plate shape, it can be set to, for example, 30 to 100 mm in length, 10 to 100 mm in width, and 0.1 to 0.5 mm in thickness.

When viewed from the stacking direction of the first single cell 100 and the second single cell 200, the second power generation element 113 includes the second terminal 18 extending outwardly from a side thereof. In the electrochemical cell X4, the second terminal 18 has the same shape as the first terminal 8. However, the second terminal 18 may have a shape different from that of the first terminal 8, for example. In addition, the material used for the first terminal 8 can be used for the second terminal 18. Specifically, the second terminal 18 may be formed of the same material as the first terminal 8, for example.

In the electrochemical cell X4, the second terminal 18 is located on any side of the outer circumference of the first power generation element 103 when viewed from the stacking direction of the first single cell 100 and the second single cell 200. In addition, the second terminal 18 extends outside the second inner container 112 in order to be electrically connected to an external device. In the electrochemical cell X4, when viewed from the stacking direction of the first single cell 100 and the second single cell 200, the second terminal 18 overlaps the first terminal 8 so that the outer circumferences thereof correspond to each other. In FIG. 11, the overlapping portions of the first terminal 8 and the second terminal 18, and the first inner container 102 and the second inner container 112 when viewed from the stacking direction of the first single cell 100 and the second single cell 200, are indicated by dotted lines.

When viewed from the stacking direction, the first power generation element 103 includes a terminal extending outwardly from a side thereof, and the second power generation element 113 includes a terminal extending outwardly from a side thereof. Then, the welded portion 34 may be located along a side where the respective terminals are not located. As a result, when the shaking is transmitted to the electrochemical cell X4 from the outside, the influence of the external force applied to the electrochemical cell X4 at a position away from each terminal fixed to the external device can be reduced.

In the electrochemical cell X4, as shown in FIG. 11, when viewed from the stacking direction of the first single cell 100 and the second single cell 200, the welded portion 34 is located along the outer peripheral sides of the first power generation element 103 and the second power generation element 113 where the first terminal 8 and the second terminal 18 are not located. More specifically, the outer peripheral sides of the first power generation element 103 and the second power generation element 113 where the first terminal 8 and the second terminal 18 are not located mean the sides where the outer peripheral sides of the first power generation element 103 and the second power generation element 113 do not overlap with the first terminal 8 and the second terminal 18. Therefore, by locating the welded portion 34 along the sides where the first terminal 8 and the second terminal 18 are not located, the first single cell 100 and the second single cell 200 can be fixed at a position away from the first terminal 8 and the second terminal 18. Therefore, the influence of the external force applied to the first single cell 100 and the second single cell 200 can be reduced. As a result, the reliability of the electrical connection of the electrochemical cell X4 can be improved.

Figure 10:
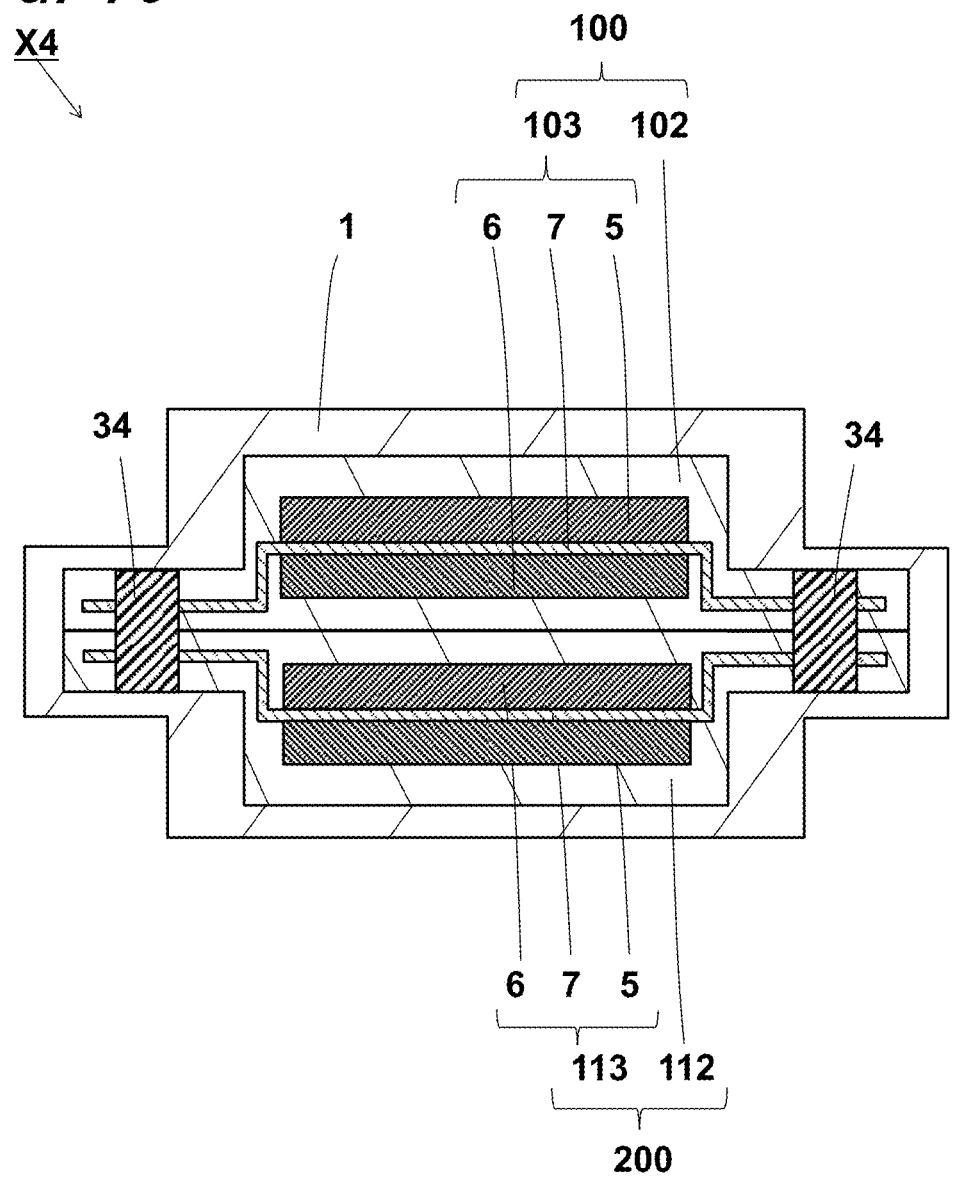
FIG. 10 shows a cross-sectional view of the electrochemical cell X4 of FIG. 9 cut long line X-X.

As shown in FIG. 10, in the electrochemical cell X4, the first inner container 102 and the second inner container 112 are welded in the welded portion 34 via the separator 7. Here, the separator 7 which is a part of the first power generation element 103 is fixed to the first inner container 102 by the welded portion 34. The separator 7 which is a part of the second power generation element 113 is fixed to the second inner container 112 by the welded portion 34. Therefore, the possibility that the positions of the first power generation element 103 and the first inner container 102 are displaced can be reduced. In addition, the possibility that the positions of the second power generation element 113 and the second inner container 112 are displaced can be reduced. As a result, the reliability of the electrical connection of the first single cell 100 and the second single cell 200 can be improved.

The number of single cells included in the electrochemical cell is not limited to two. The electrochemical cell may include three or more single cells. Here, the welded portion may fix at least two of the three or more single cells. An electrochemical cell X5 includes three single cells. The electrochemical cell X5 will be described in detail with reference to FIGS. 12 and 13. In the electrochemical cell X5, a welded portion 44 fixes three single cells.

Figure 12:
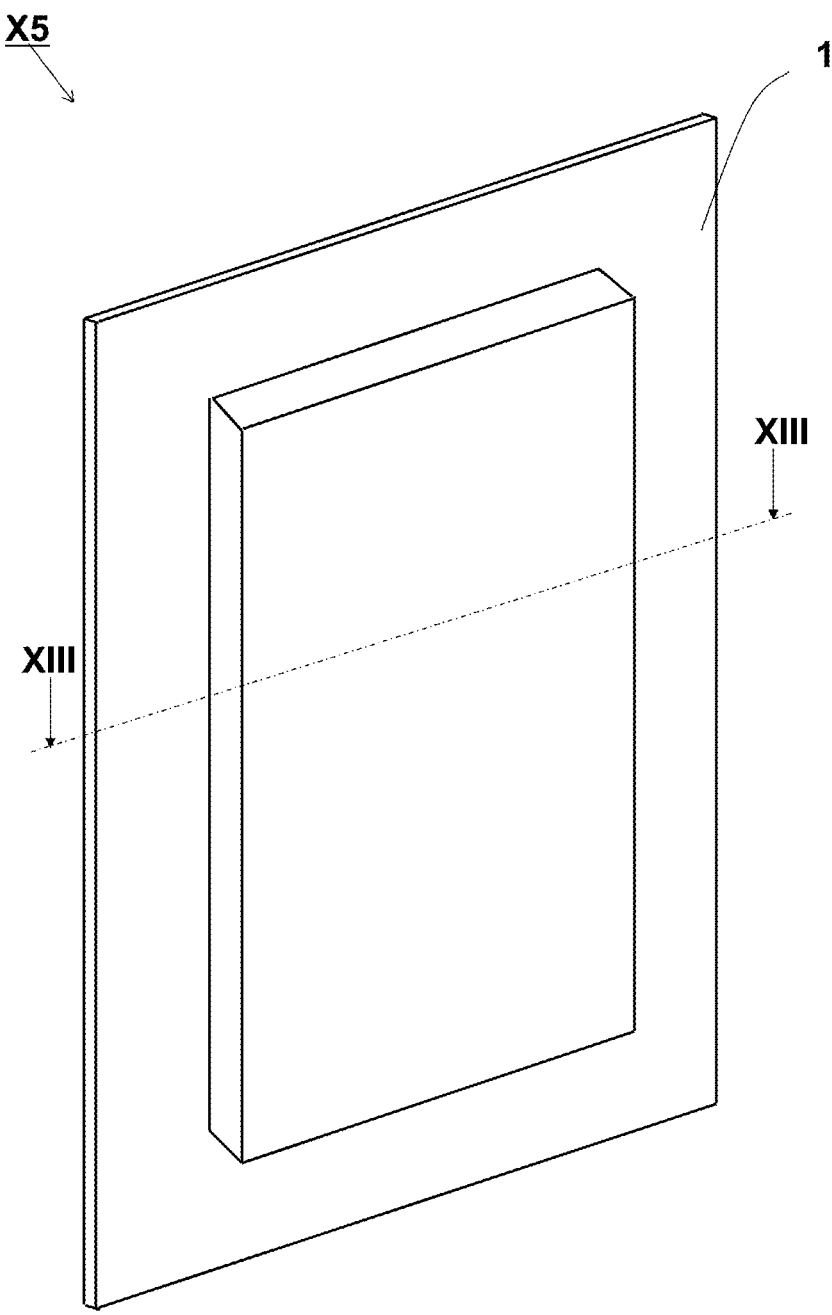
FIG. 12 shows a perspective view of an electrochemical cell X5.
Figure 13:
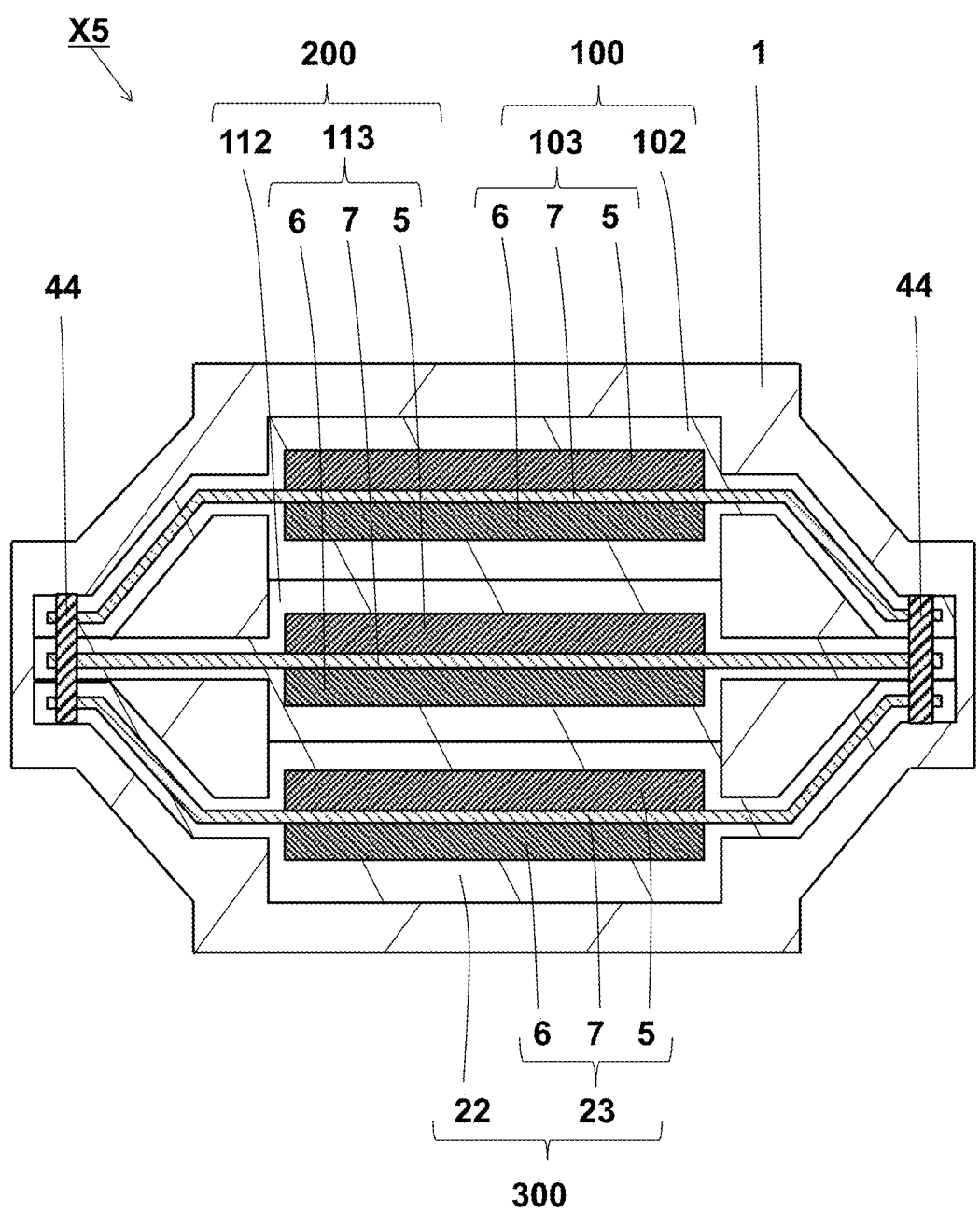
FIG. 13 shows a cross-sectional view of the electrochemical cell X5 of FIG. 12 taken along the line XIII-XIII.

As shown in FIGS. 12 and 13, the electrochemical cell X5 includes the first single cell 100, the second single cell 200, a third single cell 300, and the outer container 1 which accommodates the first single cell 100, the second cell 200, and the third single cell 300. Further, the first single cell 100, the second single cell 200, and the third single cell 300 are fixed by the welded portion 44.

The electrochemical cell X5 is different from the electrochemical cell X4 in that the electrochemical cell X5 includes the third single cell 300. The configuration of the electrochemical cell X5 other than the above is the same as the electrochemical cell X4, and thus, the description thereof is omitted.

The third single cell 300 includes a third power generation element 23 and a third inner container 22. The third power generation element 23 has the same shape as the first power generation element 103 and the second power generation element 113 in the electrochemical cell X5. However, the third power generation element 23 may have a shape different from those of the first power generation element 103 and the second power generation element 113. As the third power generation element 23, the materials used for the first power generation element 103 and the second power generation element 113 can be used. More specifically, the third power generation element 23 may be formed of, for example, the same material as the first power generation element 103 and the second power generation element 113. When viewed from the stacking direction of the first power generation element 103, the second power generation element 113, and the third power generation element 23, the first power generation element 103, the second power generation element 113, and the third power generation element 23 have a rectangular shape including long sides and short sides. The first power generation element 103, the second power generation element 113, and the third power generation element 23 are stacked so that the respective long sides and the respective short sides thereof correspond to each other.

The third inner container 22 has the same shape as the first inner container 102 and the second inner container 112 in the electrochemical cell X5. However, the third inner container 22 may have a different shape from those of the first inner container 102 and the second inner container 112. As the third inner container 22, the materials used for the first inner container 102 and the second inner container 112 can be used. Specifically, the third inner container 22 may be formed of, for example, the same material as the first inner container 102 and the second inner container 112.

The electrochemical cell X5 includes the welded portion 44 in which the first single cell 100, the second single cell 200, and the third single cell 300 are welded to each other. The welded portion 44 is provided to fix the first single cell 100, the second single cell 200, and the third single cell 300. More specifically, as shown in FIG. 13, the welded portion 44 fixes the first single cell 100, the second single cell 200, and the third single cell 300 to each other. As a result, the first single cell 100, the second single cell 200, and the third single cell 300 can be fixed more firmly than when at least two single cells are fixed. Therefore, the reliability of the electrical connection of the electrochemical cell X5 can be improved.

For the sake of simplicity, in FIGS. 1 to 13, each single cell, each power generation element, each inner container, and each terminal are illustrated in the same shape so that the respective outer circumferences thereof correspond to each other. However, the outer circumferences thereof do not need to have the same shape and correspond to each other in the strict sense. For example, if the error of the first power generation element 103 and the second power generation element 113 is within 5 mm, they can be regarded as having the same shape and overlapping so that the respective outer circumferences thereof correspond to each other. This also applies to each single cell, each inner container, and each terminal.

The invention claimed is:

1. An electrochemical cell, comprising:
  a first single cell comprising
    a first power generation element, and
    a first inner container which accommodates the first power generation element;
  a second single cell comprising
    a second power generation element, and
    a second inner container which accommodates the second power generation element;
  an outer container which accommodates the first single cell and the second single cell, the first single cell and the second single cell being stacked with the first single cell; and
  at least one welded portion in which the first inner container is welded to the second inner container.

2. The electrochemical cell according to claim 1, wherein the at least one welded portion comprises a plurality of welded portions.

3. The electrochemical cell according to claim 1, wherein when viewed from a stacking direction of the first single cell and the second single cell,
  an entirety of the first power generation element is located inside an outer circumference of the first inner container, and the first inner container comprises a first peripheral edge portion which does not overlap with the first power generation element,
  an entirety of the second power generation element is located inside an outer circumference of the second inner container, and the second inner container comprises a second peripheral edge portion which does not overlap with the first power generation element, and
  in the at least one welded portion, the first peripheral edge portion and the second peripheral edge portion are welded to each other.

4. The electrochemical cell according to claim 3, wherein when viewed from the stacking direction,
  the first power generation element and the second power generation element have a same rectangular shape and are overlapped with each other so that respective long sides and short sides thereof correspond to each other, and
  the at least one welded portion is located along the respective long sides or extension lines of the respective long sides.

5. The electrochemical cell according to claim 3, wherein when viewed from the stacking direction,
  the first power generation element and the second power generation element have a same rectangular shape and are overlapped with each other so that respective long sides and short sides thereof correspond to each other, and
  the at least one welded portion has a rectangular shape along the respective long sides or extension lines of the respective long sides.

6. The electrochemical cell according to claim 4, wherein when viewed from the stacking direction,
  the at least one welded portion is located in a region surrounded by the extension lines of the long sides of the first power generation element, the extension lines of the short sides of the first power generation element, and the outer circumference of the first inner container.

7. The electrochemical cell according to claim 1, wherein when viewed from the stacking direction,
  the first power generation element includes a first terminal extending outwardly from a side thereof, and the second power generation element includes a second terminal extending outwardly from a side thereof, and
  the at least one welded portion is located along sides of the first power generation element and the second power generation element where the respective first and second terminals are not located.

8. The electrochemical cell according to claim 3, wherein the at least one welded portion includes a convex portion protruding from the first inner container into the outer container.

9. The electrochemical cell according to claim 3, wherein the first power generation element includes
a first positive electrode,
a first negative electrode stacked on the first positive electrode in the stacking direction, and
a first separator between the first positive electrode and the first negative electrode, wherein the first separator extends into the first peripheral edge portion and the second peripheral edge portion.

10. The electrochemical cell according to claim 9, wherein
the at least one welded portion includes
a first welded portion at the first peripheral edge portion, and
a second welded portion at the second peripheral edge portion, and
the first separator is fixed to the first inner container through the first welded portion and the second welded portion.

11. The electrochemical cell according to claim 9, wherein
the second power generation element includes
a second positive electrode,
a second negative electrode stacked on the second positive electrode in the stacking direction, and
a second separator between the second positive electrode and the second negative electrode, wherein the second separator extends into the first peripheral edge portion and the second peripheral edge portion.

12. The electrochemical cell according to claim 11, wherein
the at least one welded portion includes
a first welded portion at the first peripheral edge portion, and
a second welded portion at the second peripheral edge portion, and
the first separator and the second separator are fixed to the first inner container and the second inner container, respectively, through the first welded portion and the second welded portion.

13. The electrochemical cell according to claim 1, wherein
the at least one welded portion is disposed outside a space between the first power generation element and the second power generation element.

14. An electrochemical cell, comprising:
a first single cell comprising
a first inner container, and
a first power generation element in the first inner container;
a second single cell disposed on the first single cell, and comprising
a second inner container, and
a second power generation element in the second inner container;
an outer container which accommodates the first single cell and the second single cell therein; and
at least one welded portion in which the first inner container is welded to the second inner container, the at least one welded portion disposed outside a space between the first power generation element and the second power generation element.

15. An electrochemical cell, comprising:
a first single cell comprising
a first power generation element, and
a first inner container which accommodates the first power generation element;
a second single cell comprising
a second power generation element, and
a second inner container which accommodates the second power generation element;
an outer container which accommodates the first single cell and the second single cell, the first single cell and the second single cell being stacked with the first single cell; and
at least one welded portion in which the first inner container is welded to the second inner container, wherein the at least one welded portion includes a material diffused from a portion of the first inner container and a portion of the second inner container, wherein
the at least one welded portion includes a convex portion protruding from the first inner container into the outer container.

* * * * *